United States Patent [19]

Howarth et al.

[11] Patent Number: 5,044,055
[45] Date of Patent: Sep. 3, 1991

[54] HYDRAULICALLY OPERATED SPINDLE CARRIER CLAMPING MECHANISM

[75] Inventors: Richard F. Howarth, Blue Bell; Robert A. DiDomizio, Lansdale; W. Edward Johnston, Shillington, all of Pa.

[73] Assignee: Parker Hannifin Corporation, Reading, Pa.

[21] Appl. No.: 534,023

[22] Filed: May 17, 1990

Related U.S. Application Data

[60] Division of Ser. No. 361,731, Jun. 2, 1989, Pat. No. 4,932,650, which is a continuation of Ser. No. 883,580, Jul. 9, 1986, abandoned.

[51] Int. Cl.⁵ .................... B23B 9/04; B23Q 17/00
[52] U.S. Cl. ........................... 29/49; 29/38 B; 74/813 L; 74/823; 82/129; 188/68; 188/74; 269/57
[58] Field of Search ............... 29/38 A, 38 B, 48.5 A, 29/49; 74/813 L, 823, 826; 82/118, 119, 129, 159; 188/68, 74; 269/57; 409/221

[56] References Cited

U.S. PATENT DOCUMENTS

| | | | |
|---|---|---|---|
| 2,051,967 | 8/1936 | Saito et al. | 188/75 X |
| 3,647,043 | 3/1972 | Garetto | 269/57 X |
| 3,747,444 | 7/1973 | Schubert | 82/129 X |
| 4,779,318 | 10/1988 | Henderson | 29/38 B |

FOREIGN PATENT DOCUMENTS

| | | | |
|---|---|---|---|
| 217796 | 1/1910 | Fed. Rep. of Germany | 74/823 |
| 580175 | 7/1933 | Fed. Rep. of Germany | 29/49 |
| 1088783 | 12/1955 | Fed. Rep. of Germany | 74/823 |
| 570939 | 5/1924 | France | 188/75 |

Primary Examiner—Z. R. Bilinsky
Attorney, Agent, or Firm—Benasutti

[57] ABSTRACT

A clamping mechanism is provided to prevent movement of the rotatable stock carrier of a multiple spindle bar machine after it has rotated into position for the machining operation. The clamping mechanism comprises a controllable locking pin to engage indexing pin slots on the stock carrier, a passive pressure brake located opposite the locking pin, and a hydraulically actuated pressure brake in the same quadrant as the locking pin. The hydraulically actuated brake clamps the carrier against the passive brake, and in combination with the locking pin holds the carrier against movements caused by the forces of the machining tools. The hydraulic brake is released by a programmable controller to allow intended rotation of the carrier to a new position.

3 Claims, 4 Drawing Sheets

HYDRAULICALLY OPERATED SPINDLE CARRIER CLAMPING MECHANISM

This is a division of U.S. application Ser. No. 361,731, filed June 02, 1989 and now U.S. Pat. No. 4,932,650 which is a continuation of Ser. No. 883,580 filed July 09, 1986 and abandoned June 02, 1989.

FIELD OF THE INVENTION

The present invention relates to automated machine equipment, and in particular to automated machine equipment utilizing a tool slide system which will accommodate a plurality of tool holders. One such common machine is known as an automatic screw machine or as a multiple spindle bar machine.

DESCRIPTION OF THE PRIOR ART

An automatic screw machine will often have a stock spindle assembly which will comprise a spindle carrier and a number of spindles, each of which will accommodate a length of bar stock. This spindle assembly may contain a number of spindles; it is not uncommon to see a spindle assembly having six or eight spindles positioned around the circumference thereof. Each of the spindles will retain the bar stock during machining operations and will automatically feed the required length of stock for the operation to be accomplished. Generally, an end tool carrier will be positioned on a center line with the spindle assembly and will provide a number of positions for tool holder assemblies. Depending upon the operations to be performed on the stock, one or more tools will be secured to the end tool carrier, which is arranged to move into the work piece and perform the necessary machining operation and then move away from the work piece to permit rotation of the spindle assembly. Such an automatic machining apparatus may include cross slides, which are arranged perpendicular to the axis through the spindle assembly and the end tool slide carrier. The cross slides, like the end tool carriers, are arranged to address the bar stock and perform additional machining operations.

In the prior art, automatic screw machines have utilized mechanical cam means for controlling the ingress and withdrawal of the end tool slide carrier, as well as the cross slides. One such prior art apparatus is known as an Acme-Gridley® multiple spindle bar machine, which is available from National Acme, 170 East 131st Street, Cleveland, Ohio 44108. In such a prior art device, the stock feed, the cross slides and the end tool carrier were controlled through the use of a drum or barrel cam arrangement and a slide roll or cam follower. If a change was desired in any of the mechanical operations of the device, such change was effected by changing the drum cams and/or assembling a plurality of cam parts on the drum to arrive at the desired drum cam configuration. Such a prior art device is illustrated in FIG. 5. Those skilled in the art will be familiar with the technique of changing the drum cam and/or assembling cam sections to a host drum for the purpose of providing a new or different drum cam.

More recently, bar machines have been introduced which utilize cross slides which eliminate the need for barrel or drum cams in cross slide positioning through the use of programmable controls and servo mechanisms. One such apparatus is available from National Acme as a 1¼ RA-6 Spindle Servo Slide Bar Machine. However, those skilled in the art will recognize that such a machine still requires that the end tool carrier slide assembly be controlled through the use of the mechanical drum cam and follower mechanisms.

With reference again to FIG. 5, there is shown such a drum cam 500 and follower mechanism 508 from the prior art machines. In such an assembly, the cam portions 501-506 must be changed in order to modify or alter the ingress and withdrawal of the end tool carrier slide assembly. Such modifications are time consuming and require precision assembly of the tool slide cams. In such a prior art construction, a plurality of cam portions are utilized to create a cam track 507 on the barrel or drum 140. The cam follower 508 is then positioned within the cam track and will mechanically move the end tool carrier slide assembly 100 through its ingress to the work, 14 provide feed where the work is performed on the stock, will then withdraw the end tool carrier assembly. A stop rod, not shown, is positioned on the guide bracket which supports the tool slide during its movement. The stop rod provides positive adjustment for maximum tool slide travel by eliminating variations in machine tolerances caused by cam and roller clearances. Such a positive stop is necessary to assure sustaining machine accuracy and repeatability in view of cam wear and cam follower clearances.

Although the prior art devices have proven reliable for mass production of large quantities of the desired article, the complex and time consuming procedure which is required to change the end tool slide movement has resulted in substantial machine set-up cost and adjustment time. In addition to the time spent in setting up the equipment, the substantial cost of such a set-up has limited the utility of such machinery for producing small quantities of the desired article.

In response to these prior art difficulties associated with machine set-up and operation, a fluid actuated method and means for controlling a tool slide was disclosed and claimed in the parent application. Also disclosed in the parent application was the hydraulically operated spindle carrier clamping mechanism which is the subject matter of this divisional application.

In the prior art automatic screw machines described above, the spindle carrier was locked in position after rotation by a shot pin locking mechanism as depicted in FIG. 4 and more completely described herein. However, such shot pin locking devices have inherent tolerances caused by the requirement to allow clearance between the carrier and its surrounding assembly housing, which may allow slight transverse and rotational movement of the carrier, particularly when subject to torque forces caused by the tooling operation. Both the housing clearance and locking pin device are subject to wear, which increases the tolerances, thus increasing the degree of undesirable movement over time.

As further described in this application, some prior art machines were provided with mechanically operated clamping shoe mechanisms in an attempt to eliminate the rotational movement permitted by the carrier clearance and to reduce the torque forces on the shot pin. Clamping shoe mechanisms of the prior art are also depicted in FIG. 4.

Despite the prior art attempts to lock the spindle against movement during the tooling operation, it has been found beneficial, when using a hydraulically actuated tool slide such as disclosed and claimed in the parent application, to utilize a passive brake and a hydraulically actuated brake in combination with the shot pin mechanism, as described herein.

SUMMARY OF THE INVENTION

This invention provides a hydraulically operated spindle carrier clamping and anti-rotation mechanism for use on a multiple spindle bar machine. It comprises an adjustable pressure passive brake located diametrically opposite and substantially aligned with a shot pin locking mechanism, and a hydraulically actuated pressure brake positioned in the same quadrant as the shot pin. A programmable controller allows timing control of the hydraulic brake.

Upon completion of the machining steps to be accomplished at a particular rotary position of the spindle carrier, hydraulic brake pressure is relaxed on the hydraulically operated brake, and the shot pin is withdrawn from the pin block associated with that rotary position. The spindle carrier rotates to the next position. The shot pin then enters the newly added pin block, holding the carrier against the passive brake. The hydraulic brake then activates and clamps the carrier against the passive brake.

The invention is particularly suited for use on a multiple spindle bar machine which has been modified by replacing the mechanical cam mechanism for controlling the movement of the end tool slide assemble with a programmable hydraulic drive.

DESCRIPTION OF DRAWINGS

FIG. 5 is a partial section of a tool slide actuator in accordance with the prior art.

DESCRIPTION OF THE PREFERRED EMBODIMENT

Figure 1:
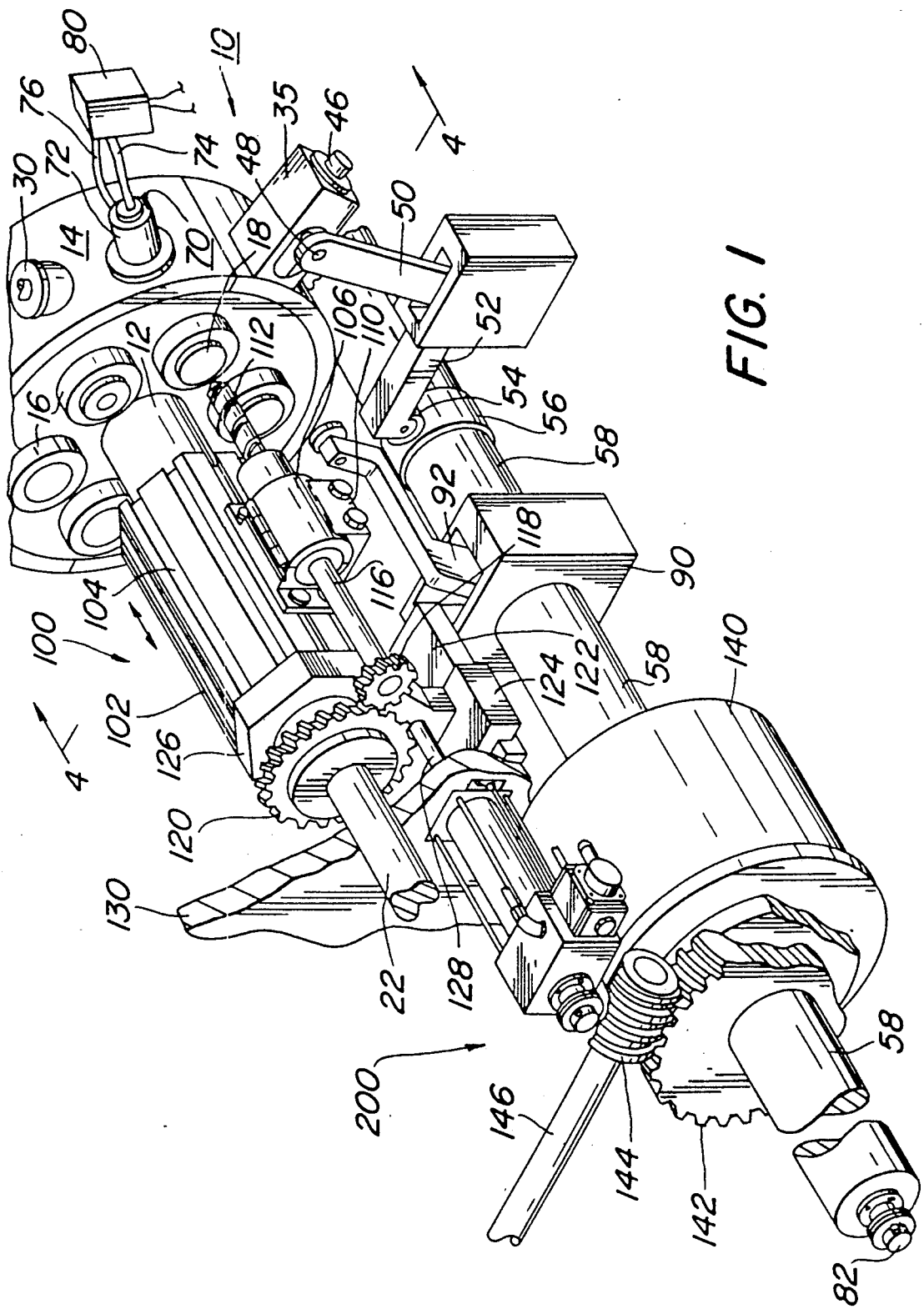
FIG. 1 is a perspective view of a portion of a multiple spindle bar machine which has been modified to include a programmable hydraulic means for activating the tool carrier and a hydraulically operated clamping and anti-rotation mechanism.

With reference to FIG. 1, there is illustrated a preferred embodiment of the invention in a retrofit application. The illustrated machine is a multiple spindle bar machine, or automated screw machine as it may be known to those skilled in the art. Generally, such an apparatus comprises a spindle assembly 10, an end tool slide assembly 100 and a control mechanism 200 for the end tool slide assembly.

The spindle assembly 10 generally comprises a spindle carrier journal 14 and a spindle carrier 13 which is mounted through the center thereof on a spindle carrier shaft 12. Spindle carrier shaft 12 is of sufficient length to extend through end tool carrier assembly 100 and to position the spindle assembly 10 and the end tool carrier assembly 100 on center line with each other. The spindle assembly 10 generally comprises a plurality of work piece spindles 16 which will grip and feed bar stock 18 into position for the selected machining operation. Thus, if the selected machining operation in a given position was a boring operation, the tool, a boring bar 112, would be advanced into the bar stock 18 and the operation completed to the desired depth and size of bore. After the tool had been removed from the work piece, the spindle assembly would index so that the machined stock 20 would move to the next station. If a second operation is desired, it would be preformed at the second station, while the first operation is repeated at the first station. Such operation will be known to those skilled in the art. Further details of the spindle assembly, as well as the improved means for locking the spindle assembly during machining operations, will be discussed hereinafter.

Figure 2:
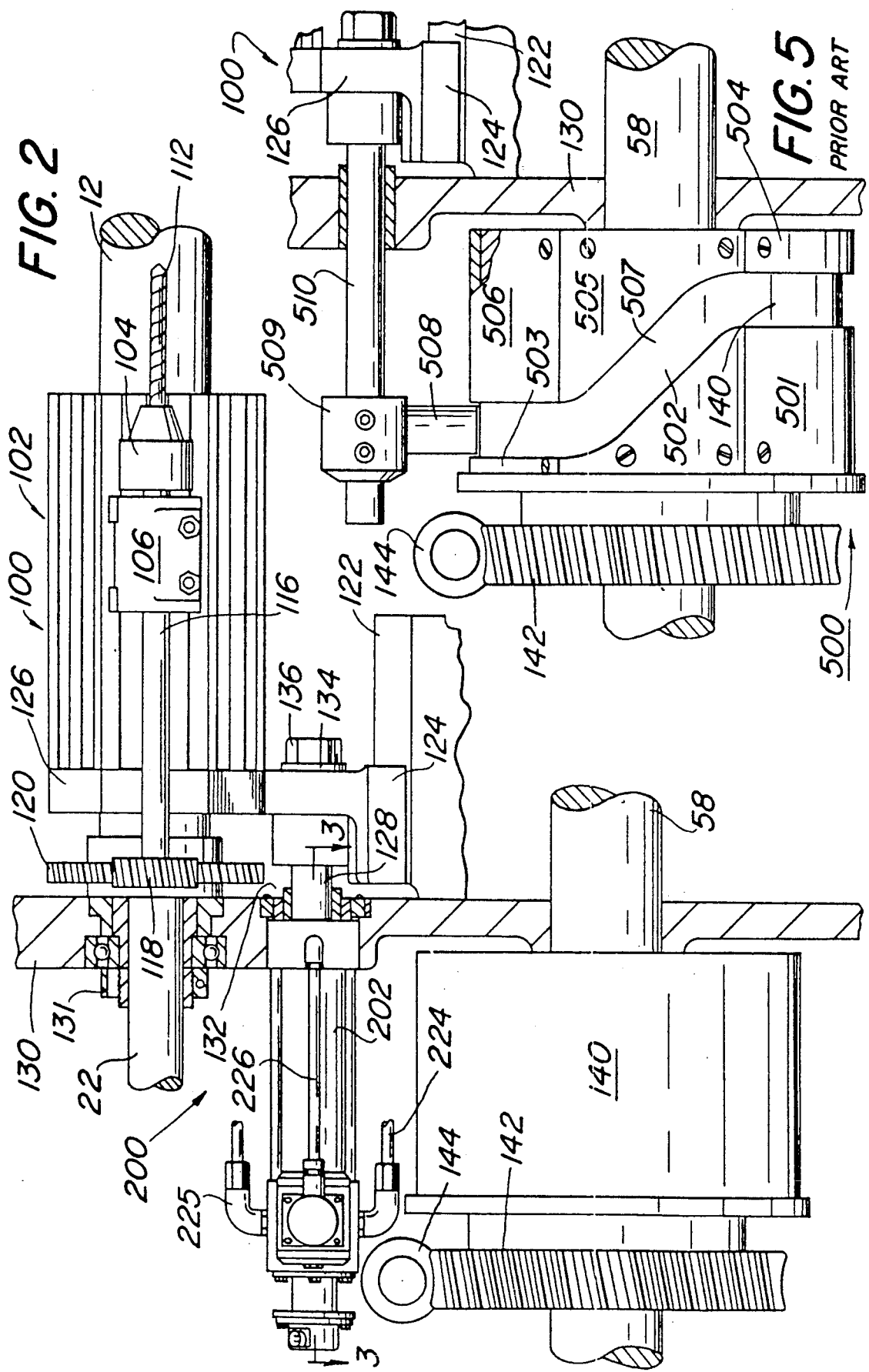
FIG. 2 is a side elevation of the programmable hydraulic means for activating the tool carrier in the environment as depicted in FIG. 1.

The end tool slide assembly 100 is generally configured to have a plurality of tooling positions which are equal in number to the work piece spindles 16. The end tool slide 102 has a number of planar surfaces to which tools are affixed. In the instant illustration, the end tool slide would have a hexagonal configuration, with positions for six tools. Each of the planar surfaces has two grooves or slots 104 which will accommodate a tool holder, 106. The tool holder 106 is affixed to the tool slide by means of a plurality of mounts 108. In the most common embodiments, the mount 108 will be a nut and bolt assembly with the bolt head being slidably received and retained within the groove or slots 104. A nut is then secured to each of the bolts to securely mount the tool holder 106 on the end tool slide. The illustrated tool holder 106, is provided with a clamp 110 which will securely fix the tool and the tool holder. The tool 112 is secured by means of a chuck 114 as shown in FIG. 2. The tool is driven through drive shaft 116, which is affixed to driven gear 118 and is ultimately powered by drive gear 120. Power for the tooling operations is provided via drive shaft 22, which is connected through a suitable gear train and pulleys (not shown) to the power source of the machine. Drive shaft 22 is on centerline with and extends through the spindle carrier shaft 12. An adjustment nut 24 is provided on drive shaft 22 to adjust the end play of the tool slide 102.

End tool slide assembly 100 will move toward and away from spindle assembly 10 on spindle carrier shaft 12. The movement of the end tool slide assembly 100 is accomplished through a guide carriage 126, which is mounted on a guide 124 for movement on guide plate 122. Movement of the end tool assembly 100 is achieved through rod 128, which is provided with a threaded end 129 extending through an aperture in the base of guide carriage 126. Further details of this assembly will be described hereinafter. Movement of the end tool slide assembly 100 is accomplished via actuator means 200, which will be described in more detail hereinafter.

With respect to the remainder of the apparatus illustrated in FIG. 1, the wall 130, shown as a fragment, is a portion of the preexisting machine casing of the retrofitted equipment. Although wall 130 as shown is not necessary to the invention and forms no part thereof, it is utilized as a means of mounting the actuator means 200 and may be replaced in new construction by a suitable bracket or mounting beam assembly.

A common shaft 58 extends beneath the tool carrier assembly 100 and the spindle assembly 10. Shaft 58 performs several useful functions. In the first function, shaft 58 has a cam lobe 56 which is ultimately used to control a locking pin assembly 35. Through rotation of shaft 58, lobe 56 is rotated through high and low spots and is followed by roller 54. The movement of lobe 56 is translated through roller 54 to a push rod 52, which is affixed to and controls the movement of connecting rod 50. Through connector pin 48, connecting rod 50 will actuate a locking pin within locking pin assembly 35. Further details of locking pin assembly 35 will be described hereinafter with reference to FIG. 4.

In addition to actuation of the locking pin, shaft 58 is also utilized to actuate a stock stop assembly 90. As known to those skilled in the art, stock stop assembly 90 is comprised of a barrel cam or drum cam mounted on shaft 58, and will cause stock stop rod 92 to rise up and stop stock at the proper distance through the spindle assembly to achieve the desired length of stock. Also mounted on shaft 58 is a barrel spacer 140 which is utilized in the retrofit embodiment as a spacer due to the fact that the original barrel or drum cam assembly has been eliminated.

With reference to FIG. 2, there is illustrated a side elevation of the end tool slide assembly 100 and the actuating means 200. As noted previously, end tool slide 102 is mounted on end tool guide carriage 126 and moves along spindle carrier shaft 12. Carriage 126 rests upon the guide plate 122 via guide 124. It will be understood by those skilled in the art that the guide plate 122 is of sufficient length to permit end tool slide 10 assembly to move to and from a sufficient distance to achieve the necessary work operation. Likewise, it will be recognized that tool holder and base 106 may be positioned at various locations along the length of the end tool slide 102. End tool guide carriage 126 is secured to rod 128 via a washer and nut assembly 134, 136. Actuator means 200 is mounted to the wall 130 with the bushing assembly 132, including a sealing surface surrounding shaft 128 (see FIG. 3) of actuator means 200 confined by wall 130. Such mounting provides the actuating means 200 with a fixed rigid reference point With respect to the 20 location of the tool slide assembly 100. Likewise,, it will be noted that spindle drive shaft 22 is mounted through wall 130 via a bearing and seal assembly 131.

Figure 3:
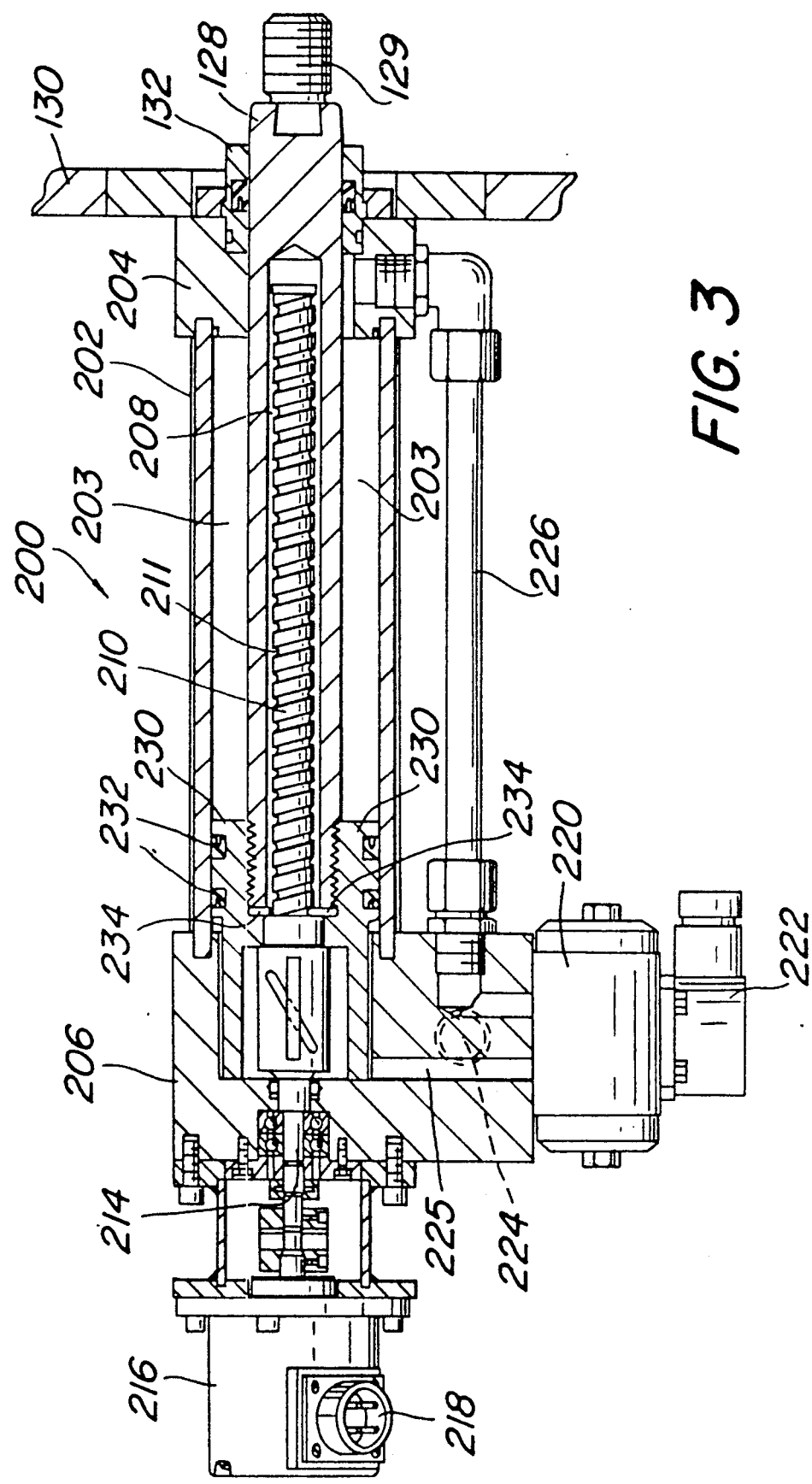
FIG. 3 is a partial section, along the line 3—3 of FIG. 2, of the actuator means.

With reference to FIG. 3, the operation and use of actuator means 200 will be described. As noted previously, rod 128 extends beyond the wall 130 and has a threaded end 129 for securement to the carriage 126. Actuating means 200 is generally comprised of a housing 202 with end caps 204 and 206. End caps 204 and 206 seal the housing 202 against fluid loss.

Shaft 128 extends through end cap 204 and into the interior of housing 202. Surrounding shaft 128 within housing 202 is an open fluid passage 203. A bore 208 is provided in the center of rod 128. Mounted within the bore 208 is a machine ball screw 5 210. Machine ball screw 210 is connected to and operatively associated with a ball nut 212 and shaft 214.

Rod 128 is connected at its distal end, via threads, to a plunger piston 230. Piston 230 is sealed against housing 202 via the seals 232. Piston 230 is also provided with a retainer 234 which moves with piston 230 and rod 128. As plunger 230 is moved through the housing 202 toward end cap 204, rod 128 is extended and ball screw 210 is rotated proportionally to the linear movement of rod 128 by the ball nut 212. Ball screw 210 extends through recirculating ball nut 212 and its rotational 15 movement, caused by corresponding travel of ball nut 212, is transmitted through shaft 214 into a rotary encoder 216. In the preferred embodiment rotary encoder 216 is a digital encoder, however, resolvers and analog means for encoding the information obtained through the ball screw 210 and ball nut 212 may be 20 utilized.

In the preferred embodiment, actuating means 200 is a numerically controlled hydraulic cylinder. Such a hydraulic cylinder is available from Atlas Cylinder Corporation, 29289 Airport Road, Eugene, Oreg. 97402-0079 as Atlas ESP-1 servo actuator. In such a cylinder, extension of the rod 128 is accomplished through a servo valve 220 and a servo valve controller 222. In response to servo valve controller 222, servo valve 220 will permit pressurized fluid supplied from fluid line 225 to flow through internal fluid line 228 to exert a pressure at the rear of plunger 230 and urge the rod 128 forward. For retraction of the rod 128, servo valve controller 222 and servo valve 220 direct the fluid through fluid line 226 and into the forward end of the housing 202 at end cap 204. Fluid line 224 provides an exhaust line for the fluid supply. In this manner, rearward pressure is applied against the piston 230 and rod 128 is retracted. In either direction of travel, rotational movement of the ball screw 210 is communicated through shaft 214 and a commensurate signal will be generated defining the linear movement of rod 128.

In actual operation of actuator 200, control is accomplished through the utilization of a Fanuc model J programmable controller, available from General Numeric Corporation, 390 Kent Avenue, Elk Grove Village, Ill. 60007. In the preferred embodiment, all program control data is entered by means of a keyboard, using an individual menu CRT display for all data related to the end tool slide. This approach permits clear indications of all parameters that are required, such as length of movement, rate of feed, dwell time, constant velocity and rate of retraction. In addition, the rate of feed and the rate of retraction may be segmented into a rapid approach and rapid retraction segment and a slower more controlled segment for approaching the bar stock or for removing the tool from the machined piece. In addition to the keyboard method, a host computer, punched tape reader, magnetic cassette reader or other comparable serial data communication device could be utilized in combination with the programmable controller.

In addition to providing the initial data, a feed back loop is created which provides continued monitoring of the actual machining operation parameters and a comparison against the control data. Other messages are displayed as necessary and the screen display is held until such time as proper data is provided within the limits of the control data or the error is corrected. In this manner, quality of the product produced is enhanced and the quantity of product rejected is reduced. In addition to allowing error messages for production purposes, the present system provides a means of constantly checking machine wear so as to avoid errors which are introduced as a result of machine defects or wear induced characteristics. In the event that the closed feed back loop information does not meet the control data requirements, the operation is automatically halted.

In addition to utilization of the programmable controller for the end tool slide, it is possible to control all servo operated cross slides along with the end tool slide. Information may be incorporated for each of the various tool slides as well as incorporation of offsets to compensate for tool wear and separate offsets to compensate for variations in spindle positions.

In addition to the increased control and monitoring benefits obtained with the present invention, variations can be made in the selected stroke length, feed rate and dwell of the end tool slide by changes in the programming information without any need to make mechanical adjustments or replacements as existed in the prior art cylinder as a driving force likewise allows the application of numerical control technology to the slide when there does not exist sufficient space to apply conventional lead screw and motor arrangements or rack and pinion arrangements or printed circuit motor drive forces.

In the preferred embodiment, the programmable controller incorporates a DAC (digital to analog converter) which will output an analog velocity command signal to servo valve controller 222. This command signal includes acceleration, deceleration and constant velocity information to obtain the desired end tool slide control. Through the ball screw 210 the slide position is continually monitored to assure accurate control and a feed back loop is created based on position and velocity.

In connection with my invention, I have discovered that the accuracy of the machine process in automated machining equipment can be further improved through utilization of a hydraulically operated 16 spindle carrier clamping and anti-rotation mechanism. As will be recognized by those skilled in the art, the spindle carrier 13 must be provided with a tolerance or clearance between the carrier 13 and the journal 14, which will permit it to rotate within the journal during planned movement of the work piece through the various tool positions. Although the spindle carrier generally rotates about carrier shaft 12, and is positioned on centerline therewith, it will be recognized that there is a need to positively lock the assembly after the carrier has rotated into position. The prior art has recognized the necessity of stabilizing the spindle carrier 13 is within the journal 14 and has provided mechanisms which attempt to accomplish this task. Such mechanisms have included locking mechanisms alone or in combination with braking mechanisms. As will be recognized by those skilled in the art, mechanically operated spindle carrier clamping mechanisms have been utilized in certain applications on large machines; however, shot pin arrangements are most common.

Figure 4:
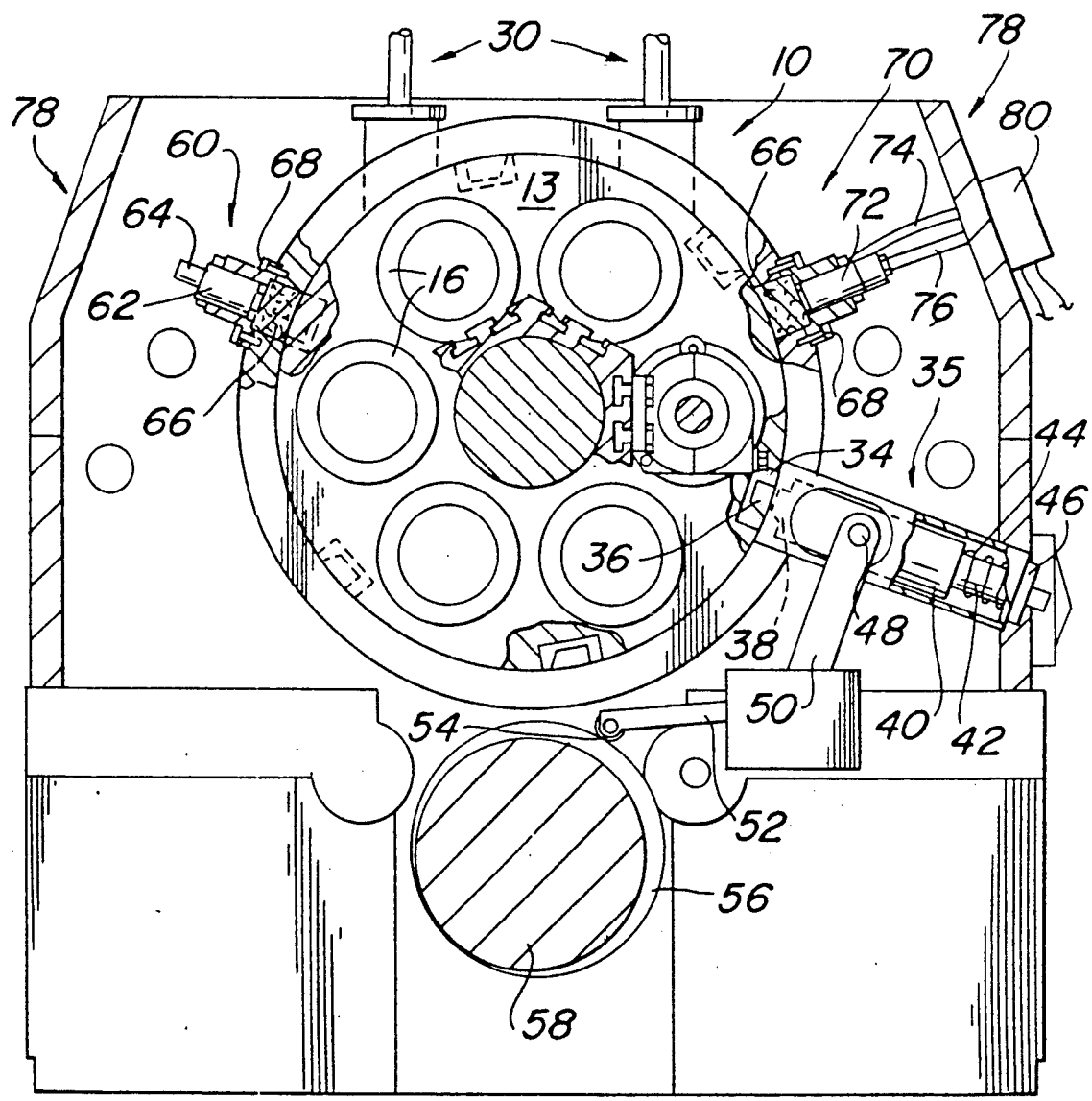
FIG. 4 is a partial section of a spindle carrier assembly, in the direction of the arrows 4 of FIG. 1, and shown in its environment in the apparatus, hydraulically operated clamping and anti-rotation mechanism.

To accommodate the shot pin arrangement, as depicted in FIG. 4, the spindle carrier 13 is provided with a number of locking pin blocks 34, which are positioned to be located opposite a locking pin housing 35 mounted on the journal 14. Each locking pin block 34 has a locking pin opening 36, which is dimensioned to receive the locking pin head 38. As will be recognized by those skilled in the art, based upon the position of the cam lobe 56, the push rod 52 would actuate connecting rod 50. Depending upon the position of the cam, the connecting rod 50 will control the locking pin body 40 and insert or withdraw the locking pin head 38 from a locking pin opening.

In the withdrawn position, the spring 44 is in a loaded condition. As the position of the cam lobe 56 is rotated, connecting rod 50 would be drawn forward, and the locking pin 25 would be driven by the spring so that the locking pin head 38 engages a locking pin opening 36 and secures spindle carrier assembly 13. It will be appreciated that such devices are homing devices and are subject to wear and tolerances. Additionally, such devices do not provide means of eliminating small rotational movement when the tooling operation begins, nor do they eliminate small translational movement permitted by the clearance between the carrier and the surrounding journal.

Consequently, in addition to locking pin or shot pin arrangements, mechanically operated clamping mechanisms have sometimes been provided. Such mechanically operated clamping mechanisms depend upon a gear, train and cam system with a cam follower and plunger arrangement which will operate a clamping shoe assembly, as is indicated in FIG. 4 at 30. Such clamping shoe assemblies will be known to those skilled in the art, and operate to press against the carrier after it has been rotated into position.

In addition to use of the clamping shoe assembly, such mechanical assemblies often include stubbing shoes (not shown) which are generally located by the clamping shoes 30. However, devices such as the locking pin and clamping shoe arrangement do not provide positive anti-rotation control, due to mechanical wear and tolerances. Despite the prior art attempts of locating and clamping the position of the spindle, I have found that it is beneficial to utilize a passive and a fluid operated brake, either in place of spindle carrier clamping shoes or in conjunction therewith. In my embodiment, I provide a passive brake block assembly or rubbing block 60. The passive brake block assembly is assembled to the spindle assembly by mount 68. A pressure block 62 is provided for adjusting a brake block 66 in accordance with the clearance between the spindle carrier 13 and journal 14. Adjustment of the brake block 66 is accomplished through a threaded shaft 64, which is secured by a lock nut (not shown). Passive brake block assembly 60 is located opposite to and substantially on centerline with the locking pin housing 35. As will be apparent from FIG. 4, the passive brake assembly 60 is adjusted to keep the brake block 66 always in contact with the carrier 13.

Passive brake block assembly 60 provides a counter force to that associated with a locking pin mechanism. As a result of usual machine wear, momentum and acceptable tolerances, the shot pin mechanism will, over time, tend to create slight mis-alignments in the spindle carrier. Thus, the passive brake block provides a positive means of countering the force of the locking pin mechanism and maintaining the desired control over initial positioning.

In addition to the passive brake block assembly, I provide an active brake block assembly 70, which is positioned on a radius of the spindle carrier assembly in the quadrant opposite the passive brake block assembly 60, and thus provides a force clamping the carrier against the passive brake when applied. Preferably the active brake is positioned approximately 45° from the locking pin, as depicted in FIG. 4, to relieve part of the forces on the pin and also provide a constant direction torque against the pin head 38 (clockwise against the straight side of the pin head, as depicted in FIG. 4). Active brake block assembly 70 is secured by mounts 68 in the manner similar to the passive assembly. Likewise, the active brake block 15 assembly utilizes a brake block 66 for contact with the spindle carrier 13. However, with active brake block assembly 70, I utilize a double acting hydraulic cylinder, with hydraulic lines 74 and 76 providing actuation pressures. One suitable double acting cylinder for this application is the 20 ENERPAC Model RWT-39, available from J. Fegley & Sons, Pottstown, Pa. The operation of active brake block assembly 70 is controlled though a hydraulic valve 80. Through operation of the hydraulic valve 80, the respective hydraulic lines 72 and 74 will be activated to either engage or disengage the brake block 66 from the spindle assembly. Control of the hydraulic valve is achieved through the rotary encoder 82. Rotary encoder 82 is associated with the shaft 58 which is in time with the stock feed, stock feed stop and the lock pin mechanism.

In operation, encoder 82 will encode the position of shaft 58 and will relay this information to a programmable controller. In the instant embodiment, the programmable controller is the same controller which is utilized to control the end tool slide mechanism. Since the timing sequence for each of the operations in known, the control data in the programmable controller will permit rotation of the spindle assembly and actuation of the lock pin prior to engagement of the active brake assembly 70. Although the actuation of the brake assembly 70 takes place after actuation of the lock pin mechanism, its application is almost instantaneous. As the brake assembly 70 actuates before the tooling begins, the spindle is clamped in a fixed position with no clearance to allow movement during machining.

Though the use of the passive brake, I am able to accomplish better tolerances than are available through utilization of just the lock pin mechanism and therefore, achieve better alignment of the work pieces. Through utilization of the active brake assembly 70, I am able to apply a positive locking pressure which will secure the spindles against small movement which may be induced due to tolerances as spindle clearance during a tooling operation. In addition to the foregone advantages, it will be recognized by those skilled in the art that hydraulic application of the brake assembly permits quicker application and continued adjustment to assure maximum application at all times. In addition, utilization of the encoder in combination with the disclosed end tool slide actuating means provides improved timing of the various functions and more accurate location during operation.

I claim:

1. In an automated machining apparatus of the type having a rotatable cylindrical carrier for holding stock material in spindles spaced at regular intervals thereon, a means for clamping the rotatable stock carrier, comprising:
   a) a controllable locking pin mechanism for selectable engagement and disengagement of a locking pin head into a slot on the carrier, said carrier having a plurality of such slots disposed on its circumference at regular intervals corresponding to the spacing of the spindles;
   b) a passive brake located adjacent to and in pressure contact with the carrier, and aligned substantially diametrically opposite the locking pin mechanism;
   c) a hydraulically actuated pressure brake located adjacent the carrier, positioned in an arc quadrant of the carrier's circumference in which the locking pin mechanism is located and having a controller means for controlling the actuation of said brake;
   d) a programmable controller for receiving and storing control data with respect to the desired rotation of the carrier and for outputting control signals to the hydraulically actuated brake controller to cause the brake controller to release the brake prior to desired rotation and to engage the brake after the desired rotation.

2. An apparatus as in claim 1, further comprising the passive brake having adjustment means to adjust the pressure contact with the carrier.

3. An apparatus as in claim 2, further comprising the hydraulically actuated brake located at approximately a fourty-five degree arc spacing from the locking pin mechanism.

* * * * *